US005457284A

United States Patent [19]

Ferguson

[11] Patent Number: 5,457,284

[45] Date of Patent: Oct. 10, 1995

[54] INTERACTIVE DIVE COMPUTER

[75] Inventor: Arthur R. Ferguson, Northbrook, Ill.

[73] Assignee: Dacor Corporation, Northfield, Ill.

[21] Appl. No.: 66,510

[22] Filed: May 24, 1993

[51] Int. Cl.[6] .................... G06F 159/00

[52] U.S. Cl. .................... 128/201.27; 364/558

[58] Field of Search .................... 364/413.31, 558; 128/905, 201.27; 405/185, 186

[56] References Cited

U.S. PATENT DOCUMENTS

| | | | |
|---|---|---|---|
| 4,109,140 | 8/1978 | Etra . | |
| 4,192,001 | 3/1980 | Villa . | |
| 4,563,758 | 1/1986 | Paternostro . | |
| 4,586,136 | 4/1986 | Lewis . | |
| 4,604,737 | 8/1986 | Hoffman | 417/52 |
| 4,658,358 | 4/1987 | Leach et al. . | |
| 4,782,338 | 11/1988 | Barshinger . | |
| 4,876,903 | 10/1989 | Budinger . | |
| 4,882,678 | 11/1989 | Hollis et al. . | |
| 5,033,818 | 7/1991 | Barr | 359/630 |
| 5,049,864 | 9/1991 | Barshinger . | |
| 5,301,668 | 4/1994 | Hales | 128/205.23 |
| 5,351,188 | 9/1994 | Sato | 364/413.31 |

*Primary Examiner*—Donald E. McElheny, Jr.
*Attorney, Agent, or Firm*—Greer, Burns & Crain, Ltd.

[57] ABSTRACT

An interactive apparatus for use by a scuba diver to provide for diver control of a specified dive-related parameter. The diver enters into the apparatus a desired parameter value, such as air reserve available at the completion of a dive, and the apparatus, based on the desired parameter and current dive conditions, determines the length of time the diver may remain at the current depth and still safely ascend to the surface. In the preferred embodiment, the apparatus also includes audible and visible alarms to alert the diver to the expiration of the determined length of safe dive time.

22 Claims, 5 Drawing Sheets

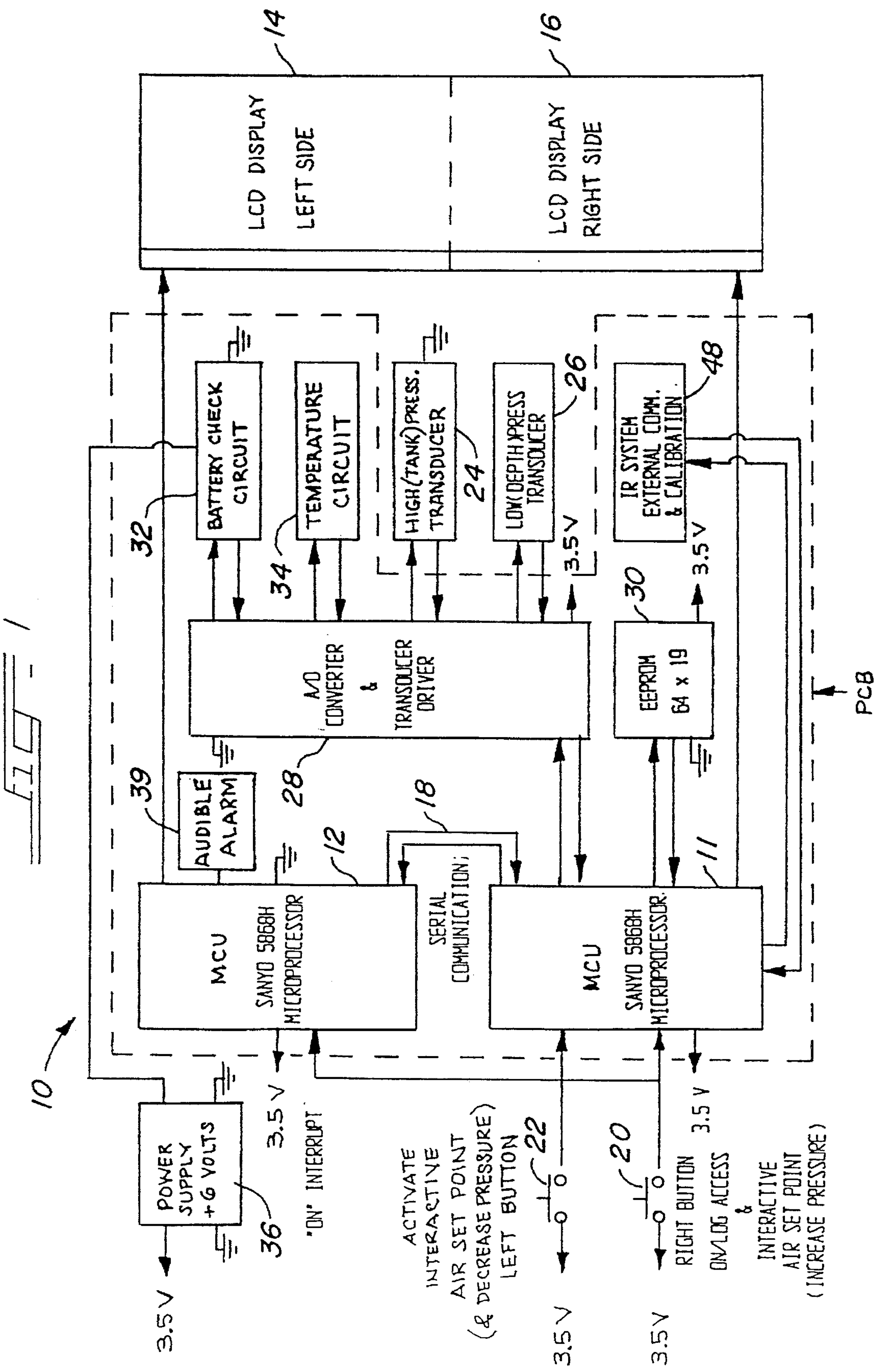
LCD DISPLAY
LEFT SIDE
LCD DISPLAY
RIGHT SIDE
BATTERY CHECK CIRCUIT
TEMPERATURE CIRCUIT
HIGH (TANK) PRESS. TRANSDUCER
LOW (DEPTH) PRESS TRANSDUCER
IR SYSTEM EXTERNAL COMM. & CALIBRATION
A/D CONVERTER & TRANSDUCER DRIVER
EEPROM 64 x 19
PCB
AUDIBLE ALARM
MCU SANYO 5868H MICROPROCESSOR
SERIAL COMMUNICATION
MCU SANYO 5868H MICROPROCESSOR
POWER SUPPLY +6 VOLTS
3.5 V
"ON" INTERRUPT
ACTIVATE INTERACTIVE AIR SET POINT (& DECREASE PRESSURE) LEFT BUTTON
RIGHT BUTTON ON/LOG ACCESS & INTERACTIVE AIR SET POINT (INCREASE PRESSURE)
10
11
12
14
16
18
20
22
24
26
28
30
32
34
36
39
48

INTERACTIVE DIVE COMPUTER

BACKGROUND OF THE INVENTION

This invention relates to computer systems for monitoring and interpreting the status of various underwater diving-related parameters, such as the status of compressed air supplies for scuba (self contained underwater breathing apparatus) divers, and in particular, relates to systems capable of receiving diver input for selected parameters, and determining specified dive characteristics in view of the diver-specific input values.

A recurring concern of users of scuba gear is how long a given air supply will last. To ensure an adequate air supply, the diver may cut his or her dive short, returning to the surface with a large excess of breathable air. Erring too far on the side of caution, however, wastes time and resources, and restricts diving flexibility. To help solve this problem, dive computers were created to assist divers maximizing the length of their dive time without incurring substantial additional risk.

Conventional dive computers calculate a diver's air consumption, measure the remaining air supply, and then determine the time a diver may safely remain at his current depth. These computers display the time remaining based on the diver reaching the surface either just prior to the complete exhaustion of his air supply or with some fixed safety margin (300 PSI, for example).

Fixed safety margins, however, are unresponsive to various diver needs. For example, the diver may require an extra air reserve in order to facilitate a long swim to shore or to a boat. Also, the diver may want an extra supply of air in case of an emergency. Furthermore, a diver may simply prefer safety margins different from those prescribed by the dive equipment manufacturers. In addition, there are other dive-related parameters which influence air consumption, or general diver performance, including the age, gender, physical condition of the diver, as well as the number, depth and duration of dives previously made by the diver.

There is a need, therefore, for an instrument that determines a safe diving or air reserve period based on both current dive conditions and the diver's personal safety margin preferences, as well as the diver's particular physical profile.

It is a main object of the invention to provide a dive computer designed to guide a diver to the surface with a diver-specified air reserve remaining in a compressed air supply at the completion of the dive.

Another object of the invention is to provide a dive computer which receives a variety of diver inputs to both more accurately monitor diver performance, and to provide additional information to the diver regarding dive-related conditions.

Yet another object of the invention is to enhance the accuracy of such a dive computer by basing dive projections on the history of previous dives and by repetitively recalculating the safe diving period during a current dive.

SUMMARY OF THE INVENTION

The above-identified objects are met or exceeded by an interactive dive computer for use by a scuba diver to assist the diver during the dive and to guide the diver to the surface using diver-specified parameters, including air reserve remaining in a compressed air supply at the completion of a dive. The present computer receives diver input of specific parameters and receives output of sensors monitoring pressure in the air supply, depth of the dive, and air consumption rates. Furthermore, the present dive computer determines dive conditions from these inputs and outputs and conveys this information to the diver with various display components.

More specifically, the present interactive dive computer provides for diver control of selected dive-related parameters and includes an input mechanism for setting at least one diver or dive-specific, dive-related parameter, a depth sensor for monitoring a depth below a surface of a body of water and an air sensor for monitoring an amount of air available in the compressed air supply. Also included in the present computer is a breathing rate monitor for monitoring air consumption over time and for determining a breathing rate for the diver, and an output device for receiving outputs from the input mechanism, the depth sensor, the air sensor, and the breathing rate monitor. The output device determines dive conditions based on the outputs which are reflective of the specific input settings selected by the diver.

In another embodiment, an interactive dive computer includes an input device enabling a diver to specify an air reserve to be available upon the completion of a dive, a water depth sensor to monitor how deep the diver dives, an air pressure sensor to monitor how much air is left in the compressed air supply, a processing unit to monitor air consumption over time, and therefore, the breathing rate of the diver, and a processing unit to accept information from all of the preceding elements. Upon receipt of the required input data, the processing unit determines a safe diving period as the length of time the diver may remain at the current depth and still safely ascend to the surface with the specified air reserve remaining in the compressed air supply. Typically, electrical switches provide the input mechanism for specifying the air reserve.

Thus, the present dive computer provides the flexibility to a diver to select his or her own safety margin. User control of the air reserve parameter is a feature that enables a diver to adjust the reserve according to his or her specific needs or circumstances of a particular dive. An advantage of the present interactive dive computer is that the diver need not be constrained by factory pre-set safety limits when they are too conservative or too liberal in light of the circumstances of an individual dive, and the displayed parameters such as the safe dive period are calculated to be specific to a particular diver.

Another feature of the present dive computer is a lock-out function for inhibiting changes to the specified parameter once a dive has commenced. This increases the reliability of the dive computer by ensuring that dive planning takes place on the surface. The lock-out continues to inhibit changes to the specified parameter after the diver has resurfaced and remains on the surface for a predetermined length of time.

Preferably, the dive computer stores the specified parameters such as air reserve value, diver age, gender, height/weight ratio, dive log history, or navigation headings. The specified values then may be used on future dives without any additional diver input. If there is no previous record of a diver-specified parameter, the computer can be configured to set the parameter to a manufacturer specified default value.

Information generated by the present dive computer can be communicated to the diver both visually and audibly. Preferably, the dive computer includes a display to confirm the specified parameter and to convey to the diver the time remaining in the safe diving period. Furthermore, an alarm is included on the present computer to help ensure that the diver begins his or her ascent at the proper time. The alarm may be audible or visible, or both.

BRIEF DESCRIPTION OF THE DRAWINGS

FIG. 1 depicts a preferred embodiment of the present dive computer in block diagram form;

DESCRIPTION OF THE PREFERRED EMBODIMENT

Figure 2A:
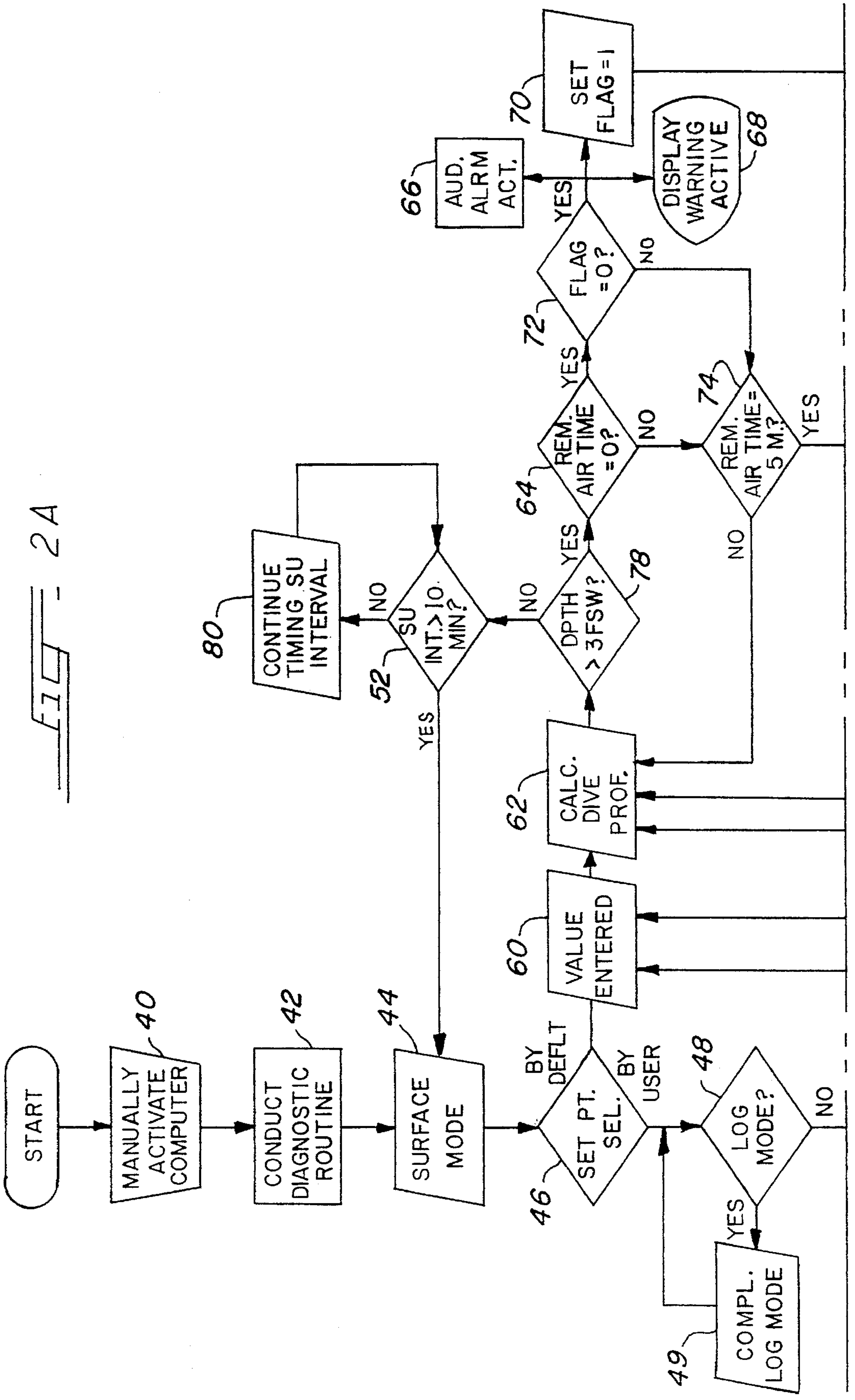
FIG. 2 depicts a preferred functional embodiment of the present dive computer in flow chart form.

Referring now to FIG. 1, the present dive computer, generally designated 10, includes two microprocessors, respectively designated 11 and 12, for processing information generated by the various input devices, and for driving displays to communicate to the user the results of that processing. In the preferred embodiment, the microprocessors 11 and 12 are Sanyo model 5868H devices, however, equivalent microprocessors are contemplated. The microprocessor 12 drives a left display 14, while the other microprocessor 11 drives a right display 16. Both left and right displays 14, 16 are preferably of the LCD type, however other suitable processor driven displays are contemplated. In the preferred embodiment 10, the processing function is divided into two physical components, microprocessors 11 and 12, although a single component is contemplated. Data passes between the microprocessors 11 and 12 via a serial data link 18, forming, in essence, a single logical processing unit. Also, the preferred embodiment 10 apportions the display function between two components, left 14 and right 16, although a single display is contemplated.

In the present dive computer 10, right and left switches, respectively designated 20 and 22, enable a diver to select a desired diver-specified, dive-related parameter. These parameters include, but are not limited to, the air reserve portion of a compressed air supply to be available at the completion of a dive, diver age, gender, height/weight ratio a dive log of previous dives, and/or navigational readings. If desired, additional switches 20, 22 may be employed for the inputting of various parameters as needed. Alternatively, various actuation combinations of the right and left switches 20, 22 may be employed to access various selected dive-related parameters.

In the preferred embodiment, the right switch 20 is connected to both microprocessors 11, 12, and activates the microprocessors when depressed, while the left switch 22 is connected only to the microprocessor 11 that drives the right side display 16. The present dive computer 10 responds to diver actuation of the switches 20, 22 to enter a specified parameter such as air reserve set point mode and to increase and decrease the value of the specified parameter.

The present dive computer 10 further includes a high tank pressure transducer 24 to monitor the compressed air supply, a low pressure transducer 26 to monitor depth, a battery check circuit 32 and a temperature circuit 34. These sensor elements 24, 26, 32, and 34 are connected to an analog-to-digital converter 28. The converter 28 accepts the analog signals, translates them into digital signals, and outputs the signals to the right side microprocessor 11. Alternately, a reciprocal path may be configured, with the converter 28 translating digital signals from the microprocessor 11 to analog signals for the sensors 24, 26, 32, and 34.

Accuracy of the present dive computer is maintained by a external communication and calibration circuit 48. The calibration circuit is connected to the right side microprocessor 11. Instructions and data for the microprocessors 11, 12 are stored in a non volatile memory EEPROM 30. The EEPROM is connected to the right side microprocessor 11. Finally, the present dive computer 10 is powered by a power supply 36, such as a conventionally available battery or combination of batteries. An audible alarm 39 is included as an addition to the display for alerting the diver of desired conditions.

Figure 2B:
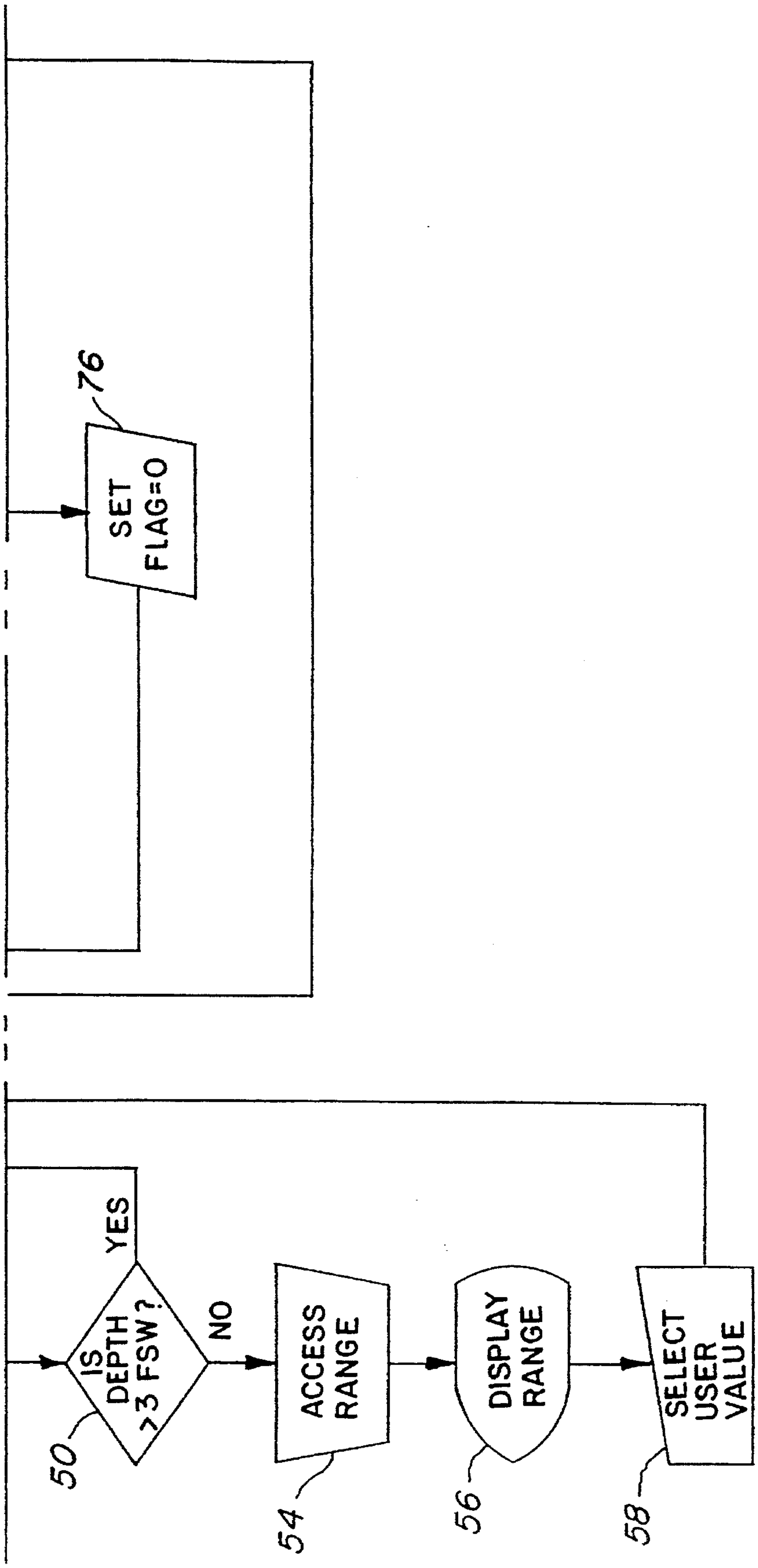

Referring now to FIG. 2, a flow chart of the present dive computer is depicted. Much of the following discussion relates to the flow chart because the microprocessors 11, 12 are configured to implement the steps depicted in FIG. 2. Selected dive-related parameters may be added, as desired, with a corresponding revision to the flow chart. However, the basic flow chart logic will be substantially similar for other input parameters. Once the desired steps are defined, the configuring of a commercially available microprocessor is a relatively routine matter.

The diver starts the process by manually activating the present dive computer 10, designated at 40. Next, a pre-dive check is performed as the present dive computer 10 enters a diagnostic mode 42. The diagnostic mode 42 includes a countdown function which must be completed before beginning the dive, or the computer 10 will turn off.

After the diagnostic mode 42 is completed, the present computer 10 enters a surface mode 44. It is contemplated that the computer 10 should be activated at the surface prior to diving. Surface activation calibrates the computer 10 to the surrounding ambient pressure. Turning the computer 10 on at depth will create a false "0" or surface point resulting in an inaccurate dive profile. The computer 10 will not activate at a depth greater than 10 feet. If diving has not begun within 30 minutes, the computer 10 will automatically turn off.

Next, the present dive computer 10 checks whether a default or a diver-specified parameter value should be used, shown at 46. For example, the air reserve value will be discussed as a representative parameter. When the computer 10 is used for the first time (or any time after the power supply 36 is interrupted, i.e., battery replacement), a 300 PSI air reserve value is automatically established. The diver may accept the 300 PSI value or decide to program a new value as shown at 46. If the diver decides to program a new air reserve value, the computer 10 checks at block 48 whether the computer is currently in log mode 49. The computer 10 inhibits changes to the air reserve value until log mode 49 is completed. Log mode 49 recounts the history of previous dives for diver transcription into a permanent log. Next, at block 50, the computer 10 checks whether the diver has already submerged. The computer 10 prevents changes to the air reserve value once a dive has commenced. Similarly, a minimum surface interval mode 80 prevents the computer 10 from entering the surface mode 44 until the computer has determined at block 52 that a resurfaced diver has remained on the surface for ten minutes. The diver cannot modify the air reserve value after a dive has begun until the computer has returned to the surface mode 44.

If the present dive computer 10 is not underwater, shown at 50, in log mode 49, or in minimum surface interval mode 80, the computer 10 proceeds to access a range of available air reserve values at block 54 and display the range to the diver at block 56. A range of 300 PSI to 950 PSI, with 50 PSI increments, is contemplated for the computer 10. The diver then selects the desired value at 58, and the computer 10 accepts the selected air reserve value at 60.

Once the air reserve value is set, the present dive computer 10 enters a calculate dive profile mode 62. The computer 10 calculates a safe diving period based on the air reserve value, current dive conditions and anticipated future needs. Both ascents and descents are calculated into the safe diving period. The computer 10 adjusts to changes in the dive profile as the changes occur, with the safe diving period increasing as the diver ascends to shallower depths and decreasing as the diver descends to deeper depths. The capacity to include multi-level diving in the calculation of the safe diving period is an advantage of the present dive computer 10 which is unavailable from conventional dive computers or table diving.

The calculate dive profile mode 62 also determines whether the diver requires decompression stops to reach the surface safely. Unlike dive tables, ascents are calculated by the computer 10 into the nitrogen uptake and elimination curves, resulting in additional bottom time and multiple level profiles. If the computer 10 determines that decompression stops are necessary, the air required for those stops is included in the computation of the safe diving period.

After each calculation, the computer 10 checks whether the diver has returned to the surface, shown at 78. If the diver has returned to the surface, the computer 10 checks whether the diver has been on the surface for ten minutes at 52. The computer 10 remains in the minimum surface interval mode 80 until the surface interval has reached ten minutes of elapsed time. After the ten minutes have elapsed, the computer returns to the surface mode 44.

If the computer 10 determines at block 78 that the diver remains submerged, the computer 10 checks whether the safe diving period has expired 64. If the period has not expired, the computer 10 checks whether the safe diving period equals 5 minutes, shown at 74. If the safe diving period does not equal 5 minutes, the computer 10 returns to the calculate dive profile mode 62. If the safe diving period equals 5 minutes, the computer 10 resets a flag 76 before returning to the calculate dive profile mode 62.

When the present dive computer 10 determines that the safe diving period has expired, it checks whether the flag has been reset 72. If the flag is in a reset state, the computer 10 activates an audible alarm 66, displays a visual alarm 68, and sets the flag 70. A set flag prevents needlessly repetitive alarms. The computer 10 then returns to the calculate dive profile mode 62.

Referring now to FIGS. 3–6, an integrated display 100 of a preferred embodiment of the present dive computer 10 is depicted. The integrated display 100 includes both the left side display 14 and the right side display 16. The left side display component 14 includes a diver-specified parameter input field 102, which as depicted displays input for surface PSI (air reserve), a safe diving period field 104, a compressed air supply pressure field 106, an ambient temperature field 108, and a display alarm field 120. The compressed air supply pressure field 106 depicts air supply pressure both graphically and numerically. Each segment of the graphic pressure bar 103 represents 200 PSI.

The right side display component 16 includes a depth field 112, a no decompression time remaining field 110, a dive sequence field 114 and an elapsed time field 118. The no decompression time remaining field 110 depicts time remaining before decompression stops are necessary both graphically and numerically. Each segment of the graphic bar 111 represents 2 minutes.

Figure 3:
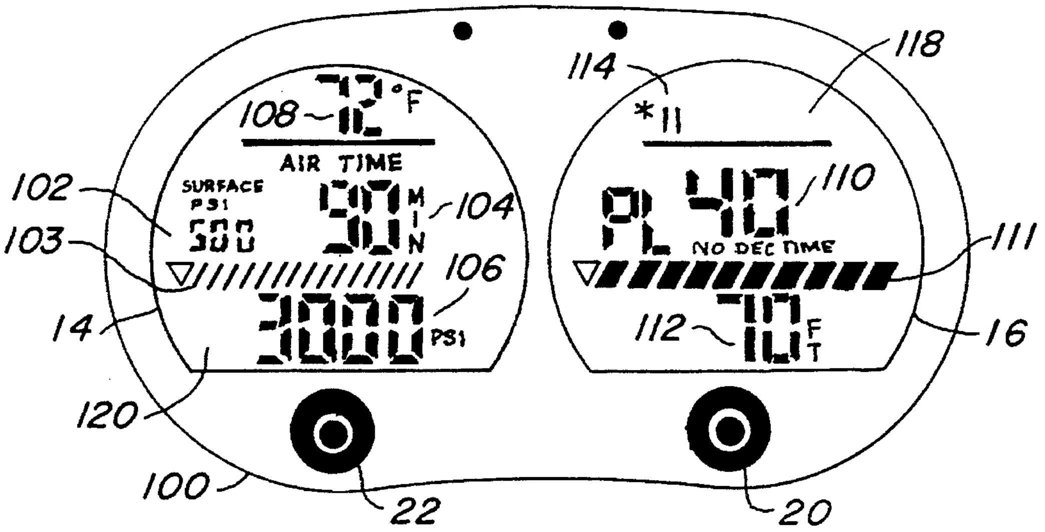
FIG. 3 depicts displays of the preferred embodiment of the present dive computer in the diver programming mode.

In operation, a diver activates the present dive computer 10 by depressing the right switch 20. Referring now to FIG. 3, The integrated display 100 of the present dive computer 10 is depicted during a pre-dive planning sequence. The safe diving period field 104 shows 90 minutes of time remaining, and the compressed air supply field 106 shows 3000 PSI of air pressure. The diver may now specify the selected dive parameter, e.g. air reserve value, by depressing the left side switch 22 for three seconds. The left side display 14 shows an air reserve value of 500 PSI in the surface PSI field 102. The diver may increase the value by 50 PSI by depressing the right switch 20. Depressing the left switch 22 decreases the value by 50 PSI. Depending on the parameter selected, other incremental parameter-specific values may be substituted for PSI, including, but not limited to, diver's age in years, and height/weight ratio. When the desired air reserve value has been selected, the diver releases the switches 20, 22, and the surface PSI field 102 goes blank within one minute.

During the dive, the safe diving period is calculated and updated once per second. The safe diving period field 104 displays the safe diving period in minutes. The safe diving period displayed is based upon default rate of 33 PSI/min consumption. Following one minute of breathing at depth, the default rate is replaced by the diver's personal rate. The present dive computer 10 resorts to the default value whenever the personal rate is unavailable (typically after the battery 36 is replaced). Repetitive or second tank dives use the stored value from the previous dive.

Figure 4:
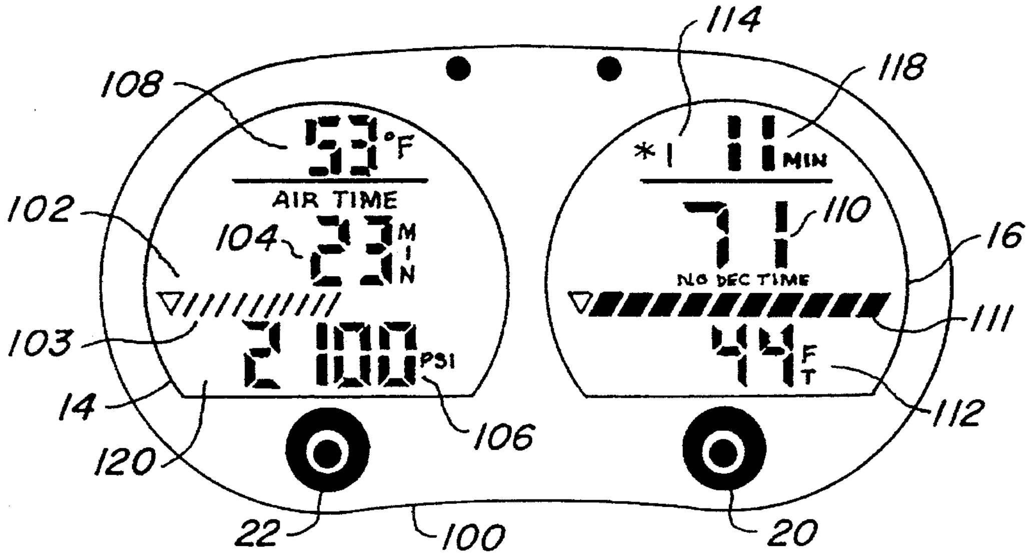
FIG. 4 depicts displays of the preferred embodiment of the present dive computer during initial stages of a dive.

Referring now to FIG. 4, the integrated display 100 of the present dive computer 10 is depicted during the early stages of a dive. The surface PSI field 102 is blank because modifications to the air reserve value are not permitted during a dive. The depth field 112 shows the diver is currently at 44 feet below the surface, and the elapsed time field 118 shows the dive began 11 minutes ago. Also, air supply pressure has dropped to 2100 PSI, as depicted in the compressed air supply field 106, and safe diving period has fallen to 23 minutes, as depicted in the safe diving period field 104. Note that the safe diving period dropped 67 minutes during the first 11 minutes of the dive. This is due in large part to the computer 10 compensating for the air required to reach the surface from 44 feet of depth.

Figure 5:
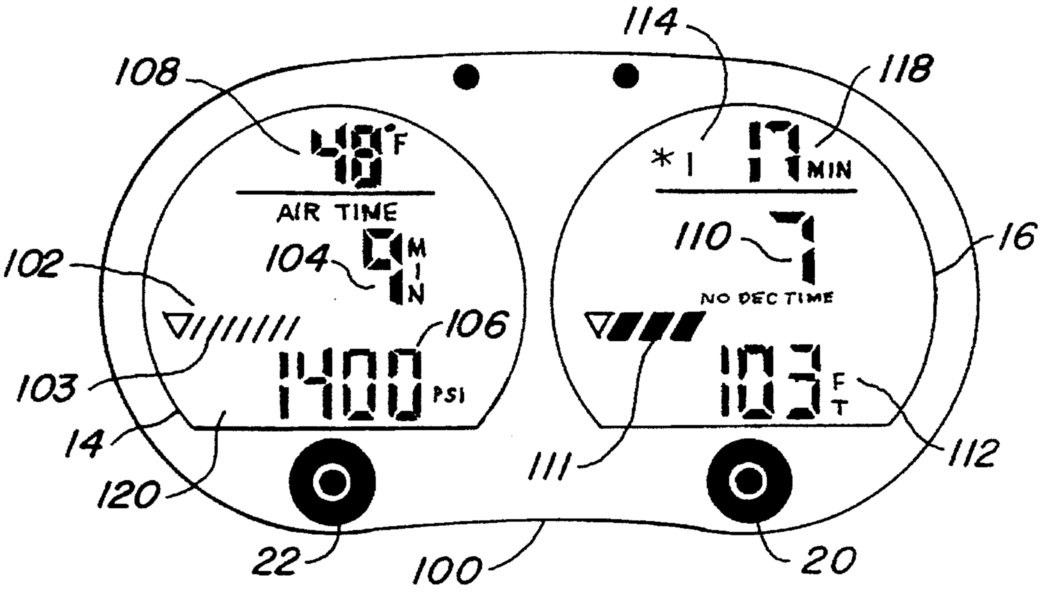
FIG. 5 depicts displays of the preferred embodiment of the present dive computer during later stages of a dive.

Referring now to FIG. 5, the integrated display 100 of the present dive computer 10 is depicted during the later stages of a dive. The depth field 112 shows the diver is currently 103 feet below the surface, and the elapsed time field 114 shows the dive is 19 minutes long. By now, air supply pressure has dropped to 1400 PSI, as depicted in the compressed air supply field 106, and safe diving period has fallen to 9 minutes, as depicted in the safe diving period field 104. Note that the safe diving period dropped 14 minutes during 8 minutes of dive time. This is due in large part to the computer 10 compensating for the extra air required to reach the surface as the diver continues to descend. Also, the ambient temperature field 108 indicates a drop in water temperature as depth increases.

Figure 6:
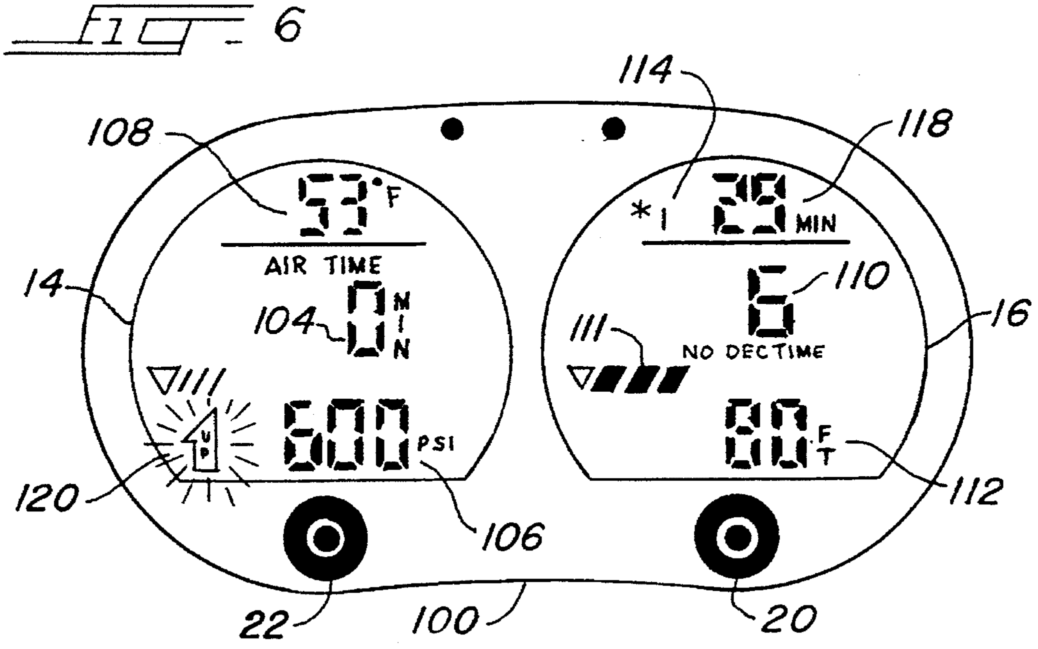
FIG. 6 depicts displays of the preferred embodiment of the present dive computer at the expiration of the safe diving period.

Referring now to FIG. 6, the integrated display 100 of the present dive computer 10 is depicted at the expiration of the safe diving period. The safe diving period field 104 shows that no time remains in the safe diving period, and the display alarm field 120 flashes an up arrow. Note that the compressed air supply field 106 shows a remaining air supply pressure of 600 PSI, 100 PSI in excess of the programmed air reserve value. If the diver ascends immediately to the surface, he or she will arrive with the programmed 500 PSI air reserve available.

When the diver enters the decompression mode, safe ascent directly to the surface is no longer permissible. The diver is obligated to remain below an indicated "ceiling" to off-gas nitrogen. This is done during a decompression (DECO) stop or a series of DECO stops depending upon the amount of nitrogen saturation in the body. The present dive computer 10 provides the diver with the depth at which to stop, the amount of time to stop, and total ascent time to reach the surface. Total ascent time represents travel to the surface at the prescribed rate of ascent plus the time spent at all DECO stops. The computer includes all of these factors in the dive profile calculation mode 62, and the safe diving period reflects the air require for safe decompression ascents.

After the diver surfaces, the present dive computer 10 enters the minimum surface interval mode 80. During the minimum surface interval mode 80, the integrated display 100 alternates between the previous dive's maximum depth and bottom time (shown on the depth field 112 and the no decompression time remaining field 110, respectively) and "surface=0 ft." for five seconds each. The safe diving period field 104 and the compressed air supply pressure field 106 continue to display the remaining safe diving period and air supply pressure, respectively. If another dive is made during this 10-minute interval, the computer 10 calculates it as a continuation of the previous dive. The air reserve value cannot be modified during this surface interval. If the diver switches compressed air supplies during the minimum surface interval, the new air supply pressure is displayed in the air supply pressure field 106. The previous air consumption rate, stored in the memory, will be used to calculate the air time until a new breathing rate is established at depth.

While a particular embodiment of the interactive dive computer of the invention has been shown and described, it will be appreciated by those skilled in the art that changes and modifications may be made thereto without departing from the invention in its broader aspects and as set forth in the following claims.

What is claimed is:

1. An interactive apparatus for use by a scuba diver to provide for diver control of selected dive-related parameters, comprising:

input means for setting at least one diver or dive-specific, dive-related parameter;

depth sensor means for monitoring a depth below a surface of a body of water;

air sensor means for monitoring an amount of air available in the compressed air supply;

computer means for receiving outputs from said input means, said depth sensor means, said air sensor means, and for monitoring air consumption over time based upon said output from said air sensor means, determining a breathing rate for the diver based on said air consumption over time, and for determining selected dive conditions based on said outputs, and which are reflective of the specific input settings selected by the diver; and display means for displaying said selected dive conditions determined by said computer means, wherein activation of said computer means is prevented when said depth sensor means monitors a predetermined depth below said surface.

2. The apparatus of claim 1, wherein said input means is configured to receive diver input signals for selecting a specified reserve portion of compressed air to be available upon completion of a dive.

3. The apparatus of claim 1, wherein said computer means performs a lock-out for inhibiting changes to at least one of the specified input parameters once a dive has commenced.

4. The apparatus of claim 3, wherein said lock-out performed by said computer means continues to inhibit changes to said at least one specified input parameter after the diver has resurfaced until the expiration of a predetermined length of time.

5. The apparatus of claim 1, wherein said computer means sets each of said input parameters to a value specified in an immediately preceding dive, subject to diver modification.

6. The apparatus of claim 1, wherein said computer means sets each of said parameters to a predetermined default value, subject to diver modification.

7. The apparatus of claim 1, wherein said computer means further determines a safe diving period reflective of said input parameters, determines a rate of safe ascent for the diver from the current depth to the surface, and determines an amount of air required to make the safe ascent, and wherein said display means displays said amount of air required for safe ascent determined by said computer means.

8. The apparatus of claim 7, wherein said computer means is configured to periodically redetermine the safe diving period in order to reflect any intervening changes in at least one of the diver's breathing rate, depth, and air required for safe ascent.

9. The apparatus of claim 7, further including alarm means connected to said computer means for alerting the diver of the expiration of the safe diving period.

10. An interactive apparatus for use by a scuba diver to provide for diver control of a reserve portion of a compressed air supply, comprising:

input means for setting said reserve portion of the compressed air supply to be available upon the completion of a dive;

depth sensor means for monitoring a depth below a surface of a body of water;

air sensor means for monitoring an amount of air available in the compressed air supply;

computer means for receiving outputs from said input means, and said depth sensor means, said air sensor means, and said breathing rate means and for monitoring air consumption over time based upon said output from said air sensor means and determining a breathing rate for the diver based upon said air consumption over time;

wherein said computer means determines a safe diving period as the length of time the diver may remain at the current depth and still safely ascend to the surface with said specified reserve portion remaining in the compressed air supply, and wherein said computer means performs a lock-out for inhibiting changes to said reserve portion once a dive has commenced.

11. The apparatus of claim 10, wherein said depth sensor means includes a transducer for measuring ambient hydrostatic pressure.

12. The apparatus of claim 10, wherein said air sensor means includes a transducer for measuring air pressure.

13. The apparatus of claim 10, wherein said computer means provides an initial predetermined breathing rate until said computer means can establish the diver's actual breathing rate.

14. The apparatus of claim 10, wherein said computer means initially sets the breathing rate to a breathing rate set in an immediately preceding dive until said breathing rate means can establish the diver's actual breathing rate for the current dive.

15. The apparatus of claim 10, further comprising a display means connected to said computer means for visually communicating to the diver the safe diving period.

16. The apparatus of claim 10, wherein said computer means alerts the diver of the expiration of the safe diving period through an alarm indication.

17. The apparatus of claim 16, wherein said alarm indication includes display means for providing a visual indication of the expiration of the safe diving period.

18. The apparatus of claim 16, wherein said alarm indication includes a sound means for providing an audible indication of the expiration of the safe diving period.

19. An interactive apparatus for use by a scuba diver to provide for diver control of a reserve portion of a compressed air supply, comprising:

input means for setting said reserve portion of the compressed air supply to be available the completion of a dive;

depth sensor means for monitoring a depth below a surface of a body of water;

air sensor means for monitoring an amount of air available in the compressed air supply;

alarm means for alerting the diver of the expiration of a safe diving period; and computer means for receiving outputs from said input means, said depth sensor means, said air sensor means, and for monitoring air consumption over time based upon said output from said air sensor means, determining a breathing rate for the diver based upon said air consumption over time, determining a rate of safe ascent for the diver from the current depth to the surface and determining the air required to make the safe ascent, and for providing an output to said alarm means;

wherein said computer means repetitively determines a safe diving period as the length of time the diver may remain at the current depth and still safely ascend to the surface with said specified reserve portion remaining in the compressed air supply, activating said alarm means when the safe diving period expires; and wherein once said alarm means is activated, and where a redetermination of the safe dive period increases due to intervening changes in the diver's breathing rate, depth, or projected ascent time, said alarm means is reset and armed to reactivate when the redetermined safe dive period again expires.

20. The apparatus of claim 19, further comprising a display means connected to said computer means for visually communicating the safe diving period to the diver.

21. An interactive apparatus for use by a scuba diver to provide for diver control of selected dive-related parameters, comprising:

input means for setting at least one diver or dive-specific, dive-related parameter;

depth sensor means for monitoring a depth below a surface of a body of water;

air sensor means for monitoring an amount of air available in the compressed air supply;

computer means for receiving outputs from said input means, said depth sensor means, said air sensor means, and for monitoring air consumption over time based upon said output from said air sensor means, determining a breathing rate for the diver based on said air consumption over time, and for determining selected dive conditions based on said outputs, and which are reflective of the specific input settings selected by the diver;

wherein said computer means performs a lock-out for inhibiting changes to at least one of the specified input parameters once a dive has commenced.

22. The apparatus of claim 21, wherein said lock-out performed by said computer means continues to inhibit changes to said at least one specified input parameter after the diver has resurfaced until the expiration of a predetermined length of time.

* * * * *